Jan. 31, 1956  H. A. MULVANY  2,733,150
PRESERVATION OF EGGS
Filed Oct. 20, 1954
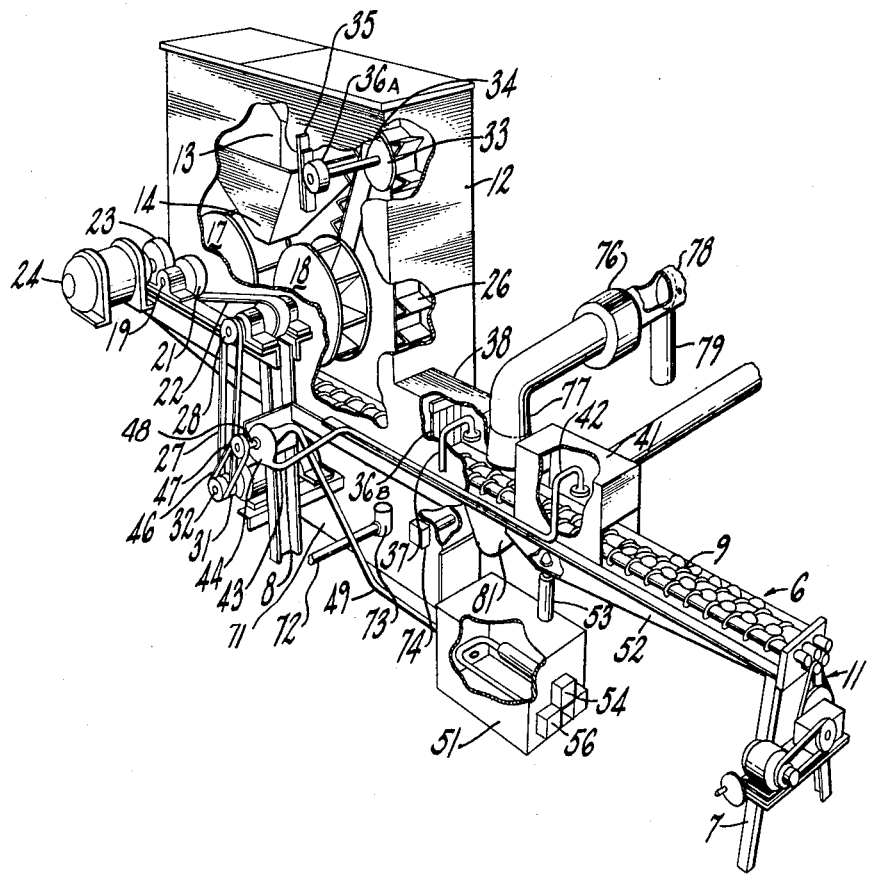
INVENTOR.
*Harry A. Mulvaney*
BY *ECKHOFF & SLICK*
*HIS ATTORNEYS*

United States Patent Office 2,733,150
Patented Jan. 31, 1956

2,733,150

PRESERVATION OF EGGS

Harry A. Mulvany, Berkeley, Calif.

Application October 20, 1954, Serial No. 463,398

11 Claims. (Cl. 99—170)

This invention relates to the cleaning and preserving of eggs.

Eggs which are soiled provide a considerable problem in the industry because the soil generally includes various bacteria which affect the egg adversely, particularly if water is used to clean the egg. This is because the wetting of the egg shell apparently distributes the bacteria more completely over the egg or eggs being cleaned; there is no harmful effect in applying water to an egg if the water and egg are each sterile. Many egg buyers will not handle so-called "dirty eggs" and even those that do generally confine their operations to "light-dirty" eggs and refuse all graded "heavy-dirty" eggs except at a very substantial price reduction, because of their very poor keeping qualities.

Few eggs are produced which are not soiled to some extent, making it necessary to clean them before marketing. Various types of sand-blasting of egg shells have been proposed and used. Dry sanding, while quite effective on "light-dirty" eggs, must be severely practiced to clean a "heavy-dirty" egg and has been criticized as removing too much of the egg shell. A wet sanding operation, involving a high velocity spraying of the eggs with water and sand, has proven very satisfactory insofar as cleaning is concerned, but the water has caused infection, which has limited the use of this process. The present invention, however, makes possible the use of such a wet sanding process without danger of infection of the eggs. A simple overall cleaning and process of the eggs is thus provided. Preferably, the eggs are first cleaned in a sand and water spray, then rinsed with fresh water or steam at a sterilizing temperature to remove sand and other loose adhering matter, then dried and finally sprayed with sterile oil so as to displace the water retained on the shells with the desired oil film. Eggs treated in this manner shrink at a very much lower rate than untreated eggs, and may be held for a period of weeks without undue drying and without becoming so-called "rots."

The application of heat to an egg shell must be carefully controlled for egg albumen has a critical coagulation temperature. I have determined that eggs can be rinsed with water and the infecting organisms on the shells thereof rendered harmless if the eggs are sprayed with water at its boiling point for a few seconds; I have successfully employed water at 212° F., applying this as a spray with the eggs in contact with the hot water for about three seconds. The water temperature should be such that the egg shell is rendered sterile within the shell-water contact period, the temperature and contact period being coordinated so that, advantage being taken of the relatively poor heat transfer property of the shell, the egg albumen is not coagulated or otherwise adversely affected. Water at approximately 212° F. or steam, and a few seconds' contact period, suffice in practice to achieve a sterile egg-shell. Thereafter, the water is removed from the shell and sterile oil applied.

The process of the present invention can be practiced readily at low cost, thereby enabling a central egg-handler to process all eggs coming into its possession and which have not been cleaned and oiled. This is of advantage for many small farmers, for example, hand wash dirty eggs with water to improve their grade. While the dirt and filth are removed from the egg shell surface, the pores of the shell still retain sufficient of the undesirable bacteria to cause egg spoilage during the period that the egg is normally in the channels of trade and distribution. Such eggs can be detected when viewed under a light corresponding to that having a wave length of approximately 4500 Angstrom units; such a light is provided by a mercury lamp having a cobalt glass shield. A truly clean egg will appear as a fresh pink color under such a light, while an apparently clean egg, but which has been washed ineffectively, will be of a color from a flat dead-white to a gold, depending on the nature of the filth originally present. By viewing the eggs under such a light, one can readily separate truly clean eggs from those which are in fact "dirty," even though the latter, to the unaided eye, may appear as clean and even cleaner than the truly clean eggs. In this manner, eggs, having their shells free from any bacteria, can be provided and placed in the channels of trade and on their way to the consumer.

It is an object of the present invention to provide a process for cleaning dirty eggs and to provide a clean, sterile, oil-coated egg as the product thereof.

Another object of the invention is to provide a process of the character described which is adapted for relatively low cost and continuous large production of processed eggs.

The invention possesses other objects and features of advantage, some of which, with the foregoing, will be set forth in the following description of the preferred form of the invention which is illustrated in the drawing accompanying and forming part of the specification. It is to be understood, however, that variations in the process as described hereunder may be adopted within the scope of the invention as set forth in the claims.

Referring to the drawing accompanying and forming a part hereof, the single figure is a perspective view of an apparatus, shown partly in diagrammatic form, for carrying out the process of the present invention.

Briefly, the present invention contemplates the wet-sanding of the eggs, as with the machine shown in my Patent 2,225,482, washing the eggs with sterilizing water or steam to remove adhering sand and oiling the eggs with a sterile oil to displace the water film on the shell surface. In the drawing, the machine depicted embodies one embodiment of means for practicing the invention.

Referring to the drawings, the machine there shown diagrammatically includes a frame structure generally indicated at 6 supported upon suitable vertical supports 7 and 8 and having several spiral conveyors 9 arranged horizontally to transport eggs from one end of the machine to the other, the spiral conveyors being driven by a drive mechanism positioned at the front of the machine and generally indicated at 11. At the rear of the frame 6 is provided a housing 12 containing a hopper 13 having a discharge 14 feeding down between two cooperatively positioned centrifugal rotors 17 and 18, as is further disclosed in the aforementioned patent. The rotors are each mounted upon shafts 19 carrying pulleys 21 thereon which are driven by belt 22 extended about each of the pulleys and about a pulley 23 on a shaft on the electric motor 24. Sand and water, discharged into the hopper 13, are discharged down between the rotors 17 and 18, to be ejected with sufficient force by these upon eggs passing along beneath the rotors on the spiral conveyors 9 to remove any adhering foreign matter. The sand is collected and washed with water, as is disclosed in the aforementioned patent, in the bottom or tank portion 71 of the housing 12 and the sand and water are returned to the hopper 13 as by a bucket elevator generally indicated at 26, this being driven by a belt 27 extended about a pulley 28 on one of the shafts 19, the belt 27 extending about a pulley 31 on a countershaft 32. At its upper end, the conveyor 26 passes about a wheel 33 supported upon a shaft 34. The shaft carries an eccentric 36A adapted to bear against members 35 mounted upon the hopper 13 to vibrate this and ensure that the wet sand feeds down upon the rotors. Issuance of air and sand from the housing 12 is prevented by a flexible cover 36B provided over the opening from the housing in the direction of advance of the eggs.

Immediately adjacent to the point whereat the eggs issue from the housing 12, I provide a nozzle 37 to spray sterilizing water or steam down upon the eggs and wash off any sand or other loose adhering material, the spray nozzle being provided with a suitable housing 38. The water or steam supplied to nozzle 37 is heated to a temperature whereat it is sterile and whereat it is effective to render harmless within a contact period of a few seconds any organism usually found on the shell of a fresh egg. Water at 140° F. will render harmless the usual organisms found on the egg shell, particularly Pseudomonas bacteria, that causing egg rot. However, it is preferred to employ a higher temperature and one can even utilize dry steam, which is preferred because the use of steam will ensure shell sterilization whereas water may inadvertently be applied at too low a temperature. However, rinsing of the eggs is generally required and water at or near 212° F. is satisfactory, about three seconds contact being all that is required. The water passes the eggs and the conveyor and is collected in the tank 71 where it is mixed with fresh cold water admitted from line 72 under the control of magnetically operated valve 73 which is controlled by tank thermostat 74. The water in the tank is maintained at a temperature of at least 140° F.; the sand and water utilized for sanding are subject to this temperature to prevent growth of the bacteria which otherwise affects the eggs adversely and causes rotting. The sand and water are held in the tank at a temperature whereat the growth of Pseudomonas bacteria is reduced and prevented. The possible Pseudomonas infection of the eggs from the sand and water is slight and any which occurs or which remains is destroyed subsequently by an application of water or steam at a temperature whereat Pseudomonas is destroyed.

Immediately following the water or steam spray application, the eggs are dried. In the machine shown, air is applied by blower 76 through nozzle 77. The air is at a drying temperature, a portion being taken from the atmosphere through inlet 78 and another portion being taken through heater 79. An air hood 81 is provided to exhaust the wet air from the eggs to an external discharge as under application of a blower draft, which blower is not shown.

Further along the run of the conveyor I provide another housing 41 having a spray nozzle 42 therein, this being connected by pipe 43 to a pump 44 driven by a belt 46 provided about a pulley 47 on the pump shaft 48. The inlet of the pump is connected by a pipe 49 to a tank 51 wherein oil is collected from drain 52 provided below the run of the conveyor adjacent to the housing 41 and extending along the run of the conveyor to the end thereof, pipe 53 connecting this drain to the tank 51. The tank includes a thermostat 54 controlling a heating element 56 so that the oil within the tank is held at a temperature and for a time whereat it is sterile.

In operation, the eggs to be processed, preferably those which have been screened by visual observation of their shells under the cobalt-shielded mercury lamp, are placed upon the conveyor 9 which is operated continuously, to subject the eggs to application of the sand and water mixture. As the eggs issue from the chamber 12, they are immediately sprayed with water or steam and any adhering sand is removed. In accordance with this invention, the water or steam is applied at a temperature whereat Pseudomonas bacteria are killed practically instantaneously; a temperature of 212° F. suffices with only a very short contact period, e. g., of the order of one second. Thereafter, the eggs are dried and are then sprayed with oil which is sterile. In accordance with this invention, the oil is preferably held to a temperature between 212° and 400° F. for a time to ensure it is sterile. At the oil spray nozzle, the hot sterile oil is either atomized with air as in a paint spray gun, or else is released under such a high pressure, e. g., 60 to 100 pounds per square inch, that it is completely atomized and is cooled, by reason of its traverse through the atmosphere, to a temperature whereat any adverse effect upon the egg is absent. In place of air, one can use any other sterile gaseous media which does not affect the oil or the eggs adversely. In place of atomizing the oil with air or other gas, one can utilize high pressure and atomize the oil mechanically, as I have depicted in the drawing, by reason of the release of a high pressure, one of the order of 1,000 pounds per square inch. In any case, the application of the hot sterile oil suffices to cause the oil film to displace any water remaining in the egg shell and to continue the sterilizing of the egg shell.

In this manner, I have been able to clean successfully and to market in acceptable condition eggs graded as "heavy-dirty," and to hold these eggs under storage conditions for many months without any loss of eggs, whereas a control batch of the same eggs, maintained under the same storage conditions, suffered an economically severe loss. Thus, the machine and the process of the present invention makes it possible to clean adequately eggs with a wet sanding operation whereby the eggs can be cleaned, even though graded as "heavy-dirty," and maintained sterile under storage conditions for many months.

The machine of the present invention and the method employed in its operation can also be used successfully even though the eggs, following cleaning and drying, are not coated with the sterile oil, but are put to another use, e. g., are broken substantially immediately. Thus, in one operation carried on in accordance with the present invention, the eggs were passed through the cleaning portion of the machine where they were subjected to a sand and water slurry for one minute at 140° F., thereupon issuing and being rinsed with water at 200° F. for five seconds, the eggs then being dried. Immediately following the drying, the eggs were broken and the yolks and whites separated. The eggs fed into the machine were taken from storage and were at a temperature of 50° F. At the conclusion of the drying operation, the eggs had a temperature of 70–75° F. However, the shell of the egg was heated almost to the temperature of the water, that is, 200° F. and, as a consequence, it was found that the eggs drained more readily and the yield in albumen or whites was increased 6–8%. This is somewhat unexpected inasmuch as an increase in temperature generally causes a proteinaceous material to become more viscous. The heat applied in the cleaning, rinsing and drying operations destroyed any salmonella bacteria on the egg shells and the whites were sterile and acceptable as a food.

In case it is desired to break the eggs immediately following cleaning and sterilization, oiling is unnecessary. However, in this case it is generally desirable that the temperature of the albumen and of the whole egg be held as low as possible. To this end, I have found it advantageous to clean the eggs with a sand slurry which is not heated, the slurry being sterile with respect to organisms causing spoilage in eggs because of the presence of a sterilizing agent, e. g., the pH of the slurry can be raised by the addition of caustic to a value high on the alkaline side, or one can include a chemical sterilizing agent which can be applied acceptably to the shell of the egg.

When the eggs are to be broken immediately following cleaning and sterilization, the air applied by blower 76 through nozzle 77 is preferably unheated, the air blast cooling the eggs by evaporation and dropping the temperature materially; for example, in one machine wherein the air blast was applied over a distance of 16 to 18 inches, the air blast lowered the temperature of the egg shells from 180° F. to 80° F. due mainly to moisture evaporation from the shell.

This is a continuation-in-part of application Serial No. 382,685, filed September 28, 1953, now abandoned, and which was, in turn, a continuation-in-part of application Serial No. 292,835, filed June 11, 1952, now abandoned, and which was, in turn, a division of application Serial No. 152,774, filed March 30, 1950, Patent 2,618,216.

I claim:

1. An egg treating process comprising subjecting the eggs to a sand-and-water spray which is sterile with respect to organisms which cause spoilage in eggs to effect a complete cleaning of the shells, then rinsing the eggs for a few seconds with a material selected from the group consisting of steam and water and which is at a temperature of about 212° F., and drying the rinsed eggs.

2. An egg treating process comprising subjecting the eggs to a sand-and-water spray which is sterile with respect to organisms which cause spoilage in eggs to effect a complete cleaning of the shells, then rinsing the eggs for a few seconds with a material selected from the group consisting of steam and water and which is at a temperature of about 212° F. and blowing air over the rinsed eggs.

3. An egg treating process comprising subjecting the eggs to a sand-and-water spray which is sterile with respect to organisms which cause spoilage in eggs to effect a complete cleaning of the shells, then rinsing the eggs for a few seconds with water which is at a temperature of about 212° F. and drying the rinsed eggs.

4. A process for preparing eggs for market comprising visually viewing the eggs under a light having a predominant wave length of about 4500 Angstrom units and separating clean eggs having a fresh pink color under said light from dirty eggs having a color other than pink under said light, subjecting the eggs to a spray of sand and water to effect a complete cleaning of the shells, said sand and water being sterile with respect to organisms which cause spoilage in eggs, then rinsing the eggs for a few seconds with a material selected from the group consisting of steam and water and which is at a temperature of about 212° F., and drying the rinsed eggs.

5. An egg treating process comprising subjecting the eggs to a sand-and-water spray which is sterile with respect to organisms which cause spoilage in eggs to effect a complete cleaning of the shells, then rinsing the eggs for a few seconds with a material selected from the group consisting of steam and water and which is at a temperature of about 212° F., drying the rinsed eggs, and then applying to the egg shells oil which is sterile with respect to organisms which cause spoilage in eggs.

6. An egg treating process comprising subjecting the eggs to a sand-and-water spray which is sterile with respect to organisms which cause spoilage in eggs to effect a complete cleaning of the shells, then rinsing the eggs for a few seconds with a material selected from the group consisting of steam and water and which is at a temperature af about 212° F., drying the rinsed eggs, and finally atomizing oil which is sterile with respect to organisms which cause spoilage in eggs to apply an oil film to the eggs.

7. An egg treating process comprising subjecting the eggs to a sand-and-water spray which is sterile with respect to organisms which cause spoilage in eggs to effect a complete cleaning of the shells, then rinsing the eggs for a few seconds with water which is at a temperature of about 212° F., drying the rinsed eggs, and then atomizing oil which is sterile with respect to organisms which cause spoilage in eggs by release of pressure thereon to apply a film to the eggs of sterile oil which is sterile with respect to organisms which cause spoilage in eggs.

8. A process as in claim 5 wherein the oil atomized is at a temperature between 212° F. and 400° F. immediately prior to atomization.

9. A process as in claim 6 wherein the oil atomized is at a temperature between 212° F. and 400° F. immediately prior to atomization.

10. A process as in claim 7 wherein the oil atomized is at a temperature between 212° F. and 400° F. immediately prior to atomization.

11. A process for preparing eggs for market comprising visually viewing the eggs under a light having a predominant wave length of about 4500 Angstrom units and separating clean eggs having a fresh pink color under said light from dirty eggs having a color other than pink under said light, subjecting the eggs to a spray of sand and water to effect a complete cleaning of the shells, said sand and water being sterile with respect to and free of organisms which cause spoilage in eggs, then rinsing the eggs for a few seconds with a material selected from the group consisting of steam and water and which is at a temperature of about 212° F., drying the rinsed eggs, and then applying sterile oil to the egg shells.

References Cited in the file of this patent

UNITED STATES PATENTS

| | | |
|---|---|---|
| 2,184,063 | Meyer et al. | Dec. 19, 1939 |
| 2,618,562 | Mulvany | Nov. 18, 1952 |